US008583637B2

(12) United States Patent
Berkner et al.

(10) Patent No.: US 8,583,637 B2
(45) Date of Patent: Nov. 12, 2013

(54) COARSE-TO-FINE NAVIGATION THROUGH PAGINATED DOCUMENTS RETRIEVED BY A TEXT SEARCH ENGINE

(75) Inventors: Kathrin Berkner, Los Altos, CA (US); Charlie K. Dagli, Grover, MO (US)

(73) Assignee: Ricoh Co., Ltd., Tokyo (JP)

( * ) Notice: Subject to any disclaimer, the term of this patent is extended or adjusted under 35 U.S.C. 154(b) by 891 days.

(21) Appl. No.: 11/689,373

(22) Filed: Mar. 21, 2007

(65) Prior Publication Data

US 2008/0235207 A1    Sep. 25, 2008

(51) Int. Cl.
  *G06F 7/10*    (2006.01)
  *G06F 7/12*    (2006.01)

(52) U.S. Cl.
  USPC ............... 707/724; 707/728; 382/298

(58) Field of Classification Search
  USPC ........... 707/1–10, 715, 726, 999.003, 728; 382/298
  See application file for complete search history.

(56) References Cited

U.S. PATENT DOCUMENTS

| | | | |
|---|---|---|---|
| 5,335,290 A | | 8/1994 | Cullen et al. |
| 5,434,953 A | * | 7/1995 | Bloomberg ............... 345/670 |
| 5,495,567 A | | 2/1996 | Iizawa et al. |
| 5,619,594 A | | 4/1997 | Melen |
| 5,625,767 A | | 4/1997 | Bartell et al. |
| 5,761,485 A | | 6/1998 | Munyan |
| 5,781,773 A | * | 7/1998 | Vanderpool et al. ......... 707/100 |
| 5,781,879 A | | 7/1998 | Arnold et al. |
| 5,832,530 A | | 11/1998 | Paknad et al. |
| 5,892,507 A | | 4/1999 | Moorby et al. |
| 5,897,644 A | | 4/1999 | Nielsen |
| 5,903,904 A | | 5/1999 | Peairs |
| 5,910,805 A | * | 6/1999 | Hickey et al. ............... 345/467 |
| 5,960,126 A | | 9/1999 | Nielsen et al. |
| 5,963,966 A | | 10/1999 | Mitchell et al. |
| 6,018,710 A | | 1/2000 | Wynblatt et al. |
| 6,043,802 A | | 3/2000 | Gormish |
| 6,044,348 A | | 3/2000 | Imade et al. |
| 6,141,452 A | | 10/2000 | Murao |

(Continued)

FOREIGN PATENT DOCUMENTS

| | | |
|---|---|---|
| EP | 1 560 127 A2 | 8/2005 |
| JP | 10-105694 | 4/1998 |

(Continued)

OTHER PUBLICATIONS

Zhao, et al., "Narrowing the Semantic Gap-Improved Text-Based Web Document Retrieval Using Visual features," IEEE, pp. 189-200.

(Continued)

*Primary Examiner* — Christyann Pulliam
*Assistant Examiner* — Sheryl Holland
(74) *Attorney, Agent, or Firm* — Blakely, Sokoloff, Taylor & Zafman LLP

(57) ABSTRACT

A method and apparatus for visualizing results from a text search engine are described. A query term is first received. A first set of results is generated based on the query term using a database storing documents, and an index of documents, each document having at least one structural element. Structural elements associated with the first set of results are retrieved. A second set of results is generated based a predefined relationship between the structure elements and the query term. A visualization of the second set of results is displayed.

29 Claims, 10 Drawing Sheets

(56) References Cited

U.S. PATENT DOCUMENTS

| | | | |
|---|---|---|---|
| 6,144,974 A | 11/2000 | Gartland | |
| 6,173,286 B1 | 1/2001 | Guttman et al. | |
| 6,178,272 B1 | 1/2001 | Segman | |
| 6,236,987 B1 * | 5/2001 | Horowitz et al. | 707/3 |
| 6,249,808 B1 | 6/2001 | Seshadri | |
| 6,317,164 B1 | 11/2001 | Hrusecky et al. | |
| 6,349,132 B1 | 2/2002 | Wesemann et al. | |
| 6,377,704 B1 | 4/2002 | Cooperman | |
| 6,598,054 B2 | 7/2003 | Schuetze et al. | |
| 6,665,841 B1 | 12/2003 | Mahoney et al. | |
| 6,704,024 B2 * | 3/2004 | Robotham et al. | 345/581 |
| 6,747,648 B2 | 6/2004 | Hoehn et al. | |
| 6,778,970 B2 | 8/2004 | Au | |
| 6,788,347 B1 | 9/2004 | Kim et al. | |
| 6,804,418 B1 | 10/2004 | Yu et al. | |
| 6,862,713 B1 | 3/2005 | Kraft et al. | |
| 6,873,343 B2 | 3/2005 | Chui | |
| 6,924,904 B2 | 8/2005 | Stevens et al. | |
| 6,928,087 B2 | 8/2005 | Slowe et al. | |
| 6,970,602 B1 | 11/2005 | Smith et al. | |
| 7,010,746 B2 | 3/2006 | Purvis | |
| 7,020,839 B1 | 3/2006 | Hosoda | |
| 7,035,438 B2 | 4/2006 | Harrington et al. | |
| 7,051,275 B2 | 5/2006 | Gupta et al. | |
| 7,069,506 B2 | 6/2006 | Rosenholtz et al. | |
| 7,095,907 B1 | 8/2006 | Berkner et al. | |
| 7,107,525 B2 | 9/2006 | Purvis | |
| 7,151,547 B2 | 12/2006 | Lin et al. | |
| 7,171,617 B2 | 1/2007 | Harrington et al. | |
| 7,177,488 B2 | 2/2007 | Berkner et al. | |
| 7,203,902 B2 | 4/2007 | Balinsky | |
| 7,263,659 B2 | 8/2007 | Hull et al. | |
| 7,272,258 B2 | 9/2007 | Berkner et al. | |
| 7,272,791 B2 | 9/2007 | Sahuc et al. | |
| 7,330,608 B2 * | 2/2008 | Berkner et al. | 382/298 |
| 7,345,688 B2 * | 3/2008 | Baudisch et al. | 345/467 |
| 7,383,505 B2 | 6/2008 | Shimizu et al. | |
| 7,428,338 B2 | 9/2008 | Berkner et al. | |
| 7,434,159 B1 | 10/2008 | Lin | |
| 7,487,445 B2 | 2/2009 | Purvis et al. | |
| 7,505,178 B2 | 3/2009 | Erol et al. | |
| 7,576,756 B1 | 8/2009 | Good et al. | |
| 7,603,620 B2 | 10/2009 | Erol et al. | |
| 7,624,169 B2 | 11/2009 | Lisiecki et al. | |
| 7,640,164 B2 | 12/2009 | Sasaki et al. | |
| 2002/0029232 A1 * | 3/2002 | Bobrow et al. | 707/517 |
| 2002/0055854 A1 | 5/2002 | Kurauchi et al. | |
| 2002/0073119 A1 | 6/2002 | Richard | |
| 2002/0184111 A1 | 12/2002 | Swanson | |
| 2002/0194324 A1 | 12/2002 | Guha | |
| 2003/0014445 A1 | 1/2003 | Formanek et al. | |
| 2003/0026104 A1 * | 2/2003 | Nagai et al. | 362/487 |
| 2003/0182402 A1 * | 9/2003 | Goodman et al. | 709/220 |
| 2004/0019851 A1 | 1/2004 | Purvis et al. | |
| 2004/0025109 A1 | 2/2004 | Harrington et al. | |
| 2004/0070631 A1 | 4/2004 | Brown et al. | |
| 2004/0093565 A1 | 5/2004 | Bernstein et al. | |
| 2004/0120589 A1 | 6/2004 | Lopresti et al. | |
| 2004/0145593 A1 | 7/2004 | Berkner et al. | |
| 2004/0181747 A1 | 9/2004 | Hull et al. | |
| 2004/0201609 A1 | 10/2004 | Obrador | |
| 2004/0230570 A1 | 11/2004 | Hatta et al. | |
| 2005/0028074 A1 | 2/2005 | Harrington et al. | |
| 2005/0068581 A1 | 3/2005 | Hull et al. | |
| 2005/0071763 A1 | 3/2005 | Hart et al. | |
| 2005/0076290 A1 | 4/2005 | Balinsky | |
| 2005/0084136 A1 | 4/2005 | Xie et al. | |
| 2005/0223326 A1 * | 10/2005 | Chang et al. | 715/533 |
| 2005/0229107 A1 | 10/2005 | Hull et al. | |
| 2005/0246375 A1 | 11/2005 | Manders et al. | |
| 2005/0289127 A1 * | 12/2005 | Giampaolo et al. | 707/3 |
| 2006/0022048 A1 | 2/2006 | Johnson | |
| 2006/0136478 A1 * | 6/2006 | Berkner | 707/102 |
| 2006/0136491 A1 * | 6/2006 | Berkner et al. | 707/103 R |
| 2006/0136803 A1 | 6/2006 | Erol et al. | |
| 2006/0161562 A1 | 7/2006 | McFarland et al. | |
| 2006/0256388 A1 | 11/2006 | Erol et al. | |
| 2007/0043706 A1 * | 2/2007 | Burke et al. | 707/3 |
| 2007/0118399 A1 | 5/2007 | Avinash et al. | |
| 2007/0168852 A1 | 7/2007 | Erol et al. | |
| 2007/0168856 A1 * | 7/2007 | Berkner et al. | 715/517 |
| 2007/0198951 A1 * | 8/2007 | Frank | 715/838 |
| 2007/0201752 A1 | 8/2007 | Gormish et al. | |
| 2007/0208996 A1 | 9/2007 | Berkner et al. | |
| 2008/0005090 A1 * | 1/2008 | Khan et al. | 707/4 |
| 2008/0005690 A1 | 1/2008 | Van Vugt | |
| 2008/0077558 A1 * | 3/2008 | Lawrence et al. | 707/3 |
| 2008/0168154 A1 | 7/2008 | Skyrm et al. | |
| 2008/0235276 A1 | 9/2008 | Erol et al. | |
| 2008/0235564 A1 | 9/2008 | Erol et al. | |
| 2008/0235585 A1 | 9/2008 | Hart et al. | |

FOREIGN PATENT DOCUMENTS

| | | |
|---|---|---|
| JP | 10-116065 | 5/1998 |
| JP | 10-162003 | 6/1998 |
| JP | 2000-231475 | 8/2000 |
| JP | 2000-306103 | 11/2000 |
| JP | 2001-056811 | 2/2001 |
| JP | 2001-101164 | 4/2001 |
| JP | 2002-351861 | 12/2002 |
| JP | 2005-110280 | 4/2005 |

OTHER PUBLICATIONS

Rollins, Sami, et al, "Wireless and Mobile Networks Performance: Power-Aware Data Management for Small Devices", Proceedings of the 5th ACM International Workshop on Wireless Mobile Multimedia WOWMOM '02, Sep. 2002, pp. 80-87.

Hexel, Rene, et al, "PowerPoint to the People: Suiting the Word to the Audience", Proceedings of the Fifth Conference on Australasian User Interface—vol. 28 AUIC '04, Jan. 2004, pp. 49-56.

Muer, O. Le, et al, "Performance Assessment of a Visual Attention System Entirely Based on a Human Vision Modeling," Proceedings of ICIP 2004, Singapore, 2004, pp. 2327-2330.

Matsuo, Y., et al, "Keyword Extraction from a Single Document using Word Co-occurrence Statistical Information," International Journal on Artificial Intelligence Tools, vol. 13, No. 1, Jul. 13, 2003, pp. 157-169.

Fukumoto, Fumiyo, et al, "An Automatic Extraction of Key Paragraphs Based on Context Dependency," Proceedings of Fifth Conference on Applied Natural Language Processing, 1997, pp. 291-298.

Aiello, Marco, et al, "Document Understanding for a Broad Class of Documents," IJDAR (2002) 5, pp. 1-16.

"About Netpbm," home page for Netpbm downloaded on Jan. 29, 2010, http://netpbm.sourceforge.net/, pp. 1-5.

"Optimization Technology Center of Northwestern University and Argonne National Laboratory," http://www.optimization.eecs.northwestern.edu/, 1 page, downloaded Jan. 29, 2010.

Dowsland, Kathryn A., et al., "Packing Problems," European Journal of Operational Research, 56 (1002) 2-14, North-Holland, 13 pages.

Iyengar, Vikram, et al., "On Using Rectangle Packing for SOC Wrapper/TAM Co-Optimization," www.ee.duke.edu/~krish/Vikram. uts02.pdf, 6 pages.

Meller, Russell D., et al., "The Facility Layout Problem: Recent and Emerging Trends and Perspectives," Journal of Manufacturing Systems, vol. 15/No. 5 1996, pp. 351-366.

Hahn, Peter, M., "Progress in Solving the Nugent Instances of the Quadratic Assignment Problem," 6 pages.

Gould, Nicholas I.M., et al., "A Quadratic Programming Bibliography," http://www.optimization-online.org/DB_FILE/2001/02/285. pdf, 139 pages.

Anjos, Miguel F., et al., "A New Mathematical Programming Framework for Facility Layout Design," University of Waterloo Technical Report UW-W&CE#2002-4, www.optimzation_online.org./DB_HTML/2002/454.html, 18 pages.

Maderlechner, et al., "Information Extraction from Document Images using Attention Based Layout Sementation," Proceedings of DLIA, 1999, pp. 216-219.

(56) References Cited

OTHER PUBLICATIONS

Wang, et al., "MobiPicture—Browsing Pictures on Mobile Devies," 2003 Multimedia Conference, Proceedings of the 11th ACM International Conference on Multimedia, ACM MM'03, ACM 1-58113-722-2/03/011, Berkeley, California, Nov. 2-8, 2003, 5 pages.

Fan, et al. "Visual Attention Based Image Browsing on Mobile Devices," International Conference on Multimedia and Exp., vol. 1, Baltimore, MD., IEEE, 0-7803-7965-9/03 Jul. 2003, pp. 53-56.

"Human Resources Toolbox, Human Resources Toolbox, Building an Inclusive Development Community: Gender Appropriate Technical Assistance to InterAction Member Agencies on Inclusion of People with Diabilities," Mobility International USA, 2002 Mobility International USA, http://www.miusa.org/idd/keyresources/hrtoolbox/humanresourcestlbx/?searchterm=Human Resources Toolbox, downloaded Feb. 3, 2010, 1 page.

Cormen, Thomas H., Leiserson, Charles, E., and Rivest, Ronald L., Introduction to Algorithms, MIT Press, MC-Graw-Hill, Cambridge Massachusetts, 1997, 6 pages.

Roth, et al., "Auditory Browser for Blind and Visually Impaired Users," CHI'99, Pittsburgh, Pennsylvania, May 15-20, 1999, ACM ISBN 1-58113-158-5, pp. 218-219.

Lam, H., et al., "Summary Thumbnails: Readable Overviews for Small Screen Web Browsers," CHI 2005, Conference Proceedings. Conference on Human Factors in Computing Systems, Portland, Oregon, Apr. 2-7, 2005, CHI Conference Proceedings, Human Factors in Computing Systems, New York, NY: ACM, US, Apr. 2, 2005, XP002378456, ISBN: 1-58113-998-5, pp. 1-10.

Erol, B., et al., "Multimedia Thumbnails: A New Way to Browse Documents on Small Display Devices," Ricoh Technical Report No. 31, XP002438409, Dec. 2005, http://www.ricoh.co.jp/about/business_overview/report/31/pdf/A3112.pdf>, 6 pages.

European Patent Office Search Report for European Patent Application EP 07 25 0134, Jun. 21, 2007, 9 pages.

Erol, Berna, et al., An Optimization Framework for Multimedia Thumbnails for Given Time, Display, and Application Constraints, Aug. 2005, 1-17 pages.

El-Kwae, E., et al., "A Robust Framework for Content-Based Retrieval by Spatial Similarity in Image Databases," Transactions on Information Systems (TOIS), vol. 17, Issue 2, Apr. 1999, pp. 174-198.

Dahl, Joachin and Vandenbeube, Lieven, "CVXOPT: A Python Package for Convex Optimization," http://abel.ee.ucla.edu/cvxopt/ downloaded Feb. 5, 2010, 2 pages.

Grant, Michael, et al., "CVX, Matlab Software for Disciplined Convex Programming," http://www.stanford.edu/~boyd/cvx/, downloaded Feb. 5, 2010, 2 pages.

Haralick, Robert M., "Document Image Understanding: Geometric and Logical Layout," IEEE Computer Vision and Pattern Recognition 1994 (CVPR94), 1063-6919/94, pp. 385-390.

Hsu, H.T., An Algorithm for Finding a Minimal Equivalent Graph of a Digraph, Journal of the ACM (JACM), V. 22 N. 1, Jan. 1975, pp. 11-16.

Nagy, Georgy, et. al., "Hierarchical Representation of Optically Scanned Documents," Proc. Seventh Int'l Conf. Pattern Recognition, Montreal, 1984 pp. 347-349.

Dengel, A., "Anastasil: A System for Low-Level and High-Level Geometric Analysis of Printed Documents" in Henry S. Baird, Horst Bunke, and Kazuhiko Yamamoto, editors, Structured Document Image Analysis, Springer-Verlag, 1992, pp. 70-98.

Duda, et al., "Pattern Classification," Second Edition, Chapter 1—Introduction, Copyright © 2001 by John Wiley & Sons, Inc., New York, ISBN0-471-05669-3 (alk. Paper), 22 pages.

Gao, et al., "An Adaptive Algorithm for Text Detection from Natural Scenes," Proceedings of the 2001 IEEE Computer Society Conferences on Computer Vision and Pattern Recognition, Kauai, HI, USA, Dec. 8-14, 6 pages.

Polyak, et al., "Mathematical Programming: Nonlinear Rescaling and Proximal-like Methods in Convex Optimization," vol. 76, 1997, pp. 265-284.

Baldick, et al., "Efficient Optimization by Modifying the Objective Function: Applications to Timing-Driven VLSI Layout," IEEE Transactions on Circuits and Systems, vol. 48, No. 8, Aug. 2001, pp. 947-956.

Kandemir, et al. "A Linear Algebra Framework for Automatic Determination of Optimal Data Layouts," IEEE Transactions on Parallel and Distributed System, vol. 10, No. 2, Feb. 1999, pp. 115-135.

Lin, Xiaofan, "Active Document Layout Synthesis," IEEE Proceedings of the Eight International Conference on Document Analysis and Recognition, Aug. 29, 2005-Sep. 1, 2005, XP010878059, Seoul, Korea, pp. 86-90.

Boyd, Stephen, et al. "Review of Convex Optimization," Internet Article, http://www.cambridge.org/us/catalogue/catalogue.asp?isbn=0521833787, Cambridge University Press, XP-002531694, Apr. 8, 2004, pp. 1-2.

European Patent Office Search Report for European Patent Application EP 07 25 0928, Jul. 8, 2009, 7 pages.

Fukuhara, R., "International Standard for Motion Pictures in addition to Still Pictures: Summary and Application of JPEG2000/Motion-JPEG2000 Second Part", Interface, Dec. 1, 2002, 13 pages, vol. 28-12, CQ Publishing Company, no translation provided, 17 pages.

Japanese Office Action for Japanese Patent Application No. 2004-018221, dated Jun. 9, 2009, 6 pages.

Harrington, Steven J., et al., "Aesthetic Measures for Automated Document Layout," Proceedings of Document Engineering '04, Milwaukee, Wisconsin, ACM 1-58113-938-1/04/0010, Oct. 28-30, 2004, 3 pages.

Opera Software, "Opera's Small-Screen Rendering ™," http://web.archive.org/web/20040207115650/http://www.opera.com/products/smartphone/smallscreen/ downloaded Feb. 25, 2010, pp. 1-4.

"AT&T Natural Voices" website, http://web.archive.org/web/20060318161559/http://www.nextup.com/attnv.html, downloaded Feb. 25, 2010, pp. 1-3.

Graham, Jamey, "The Reader's Helper: a personalized document reading environment," Proc. SIGCHI '99, May 15-20, 1999, pp. 481-488, (9 pgs.).

JBIG—Information Technology—Coded Representation of Picture and Audio Information—Lossy/Lossless Coding of Bi-level Images, ISO/IEC, JTC1/SC 29/WG1 N1359, 14492 FCD, Jul. 16, 1999, (189 pgs.).

JPEG 2000 Part 6 FCD15444-6, Information Technology JPEG 2000 "Image Coding Standard—Part 6: Compound Image File Format" ISO/IEC, JTC1/SC 29/WG1 N2401, FCD 15444-6, Nov. 16, 2001 (81 pgs.).

Liu, F, et al., "Video Retargeting: Automating Pan and Scan," Proceedings of International Conference of ACM Multimedia, Oct. 23-278, 2006,Santa Barbara, CA, ACM 1-59593-447-2/06/0010, 10 pages.

Marshall, C.C, et al., "Reading-in-the-Small: A Study of Reading on Small Form Factor Devices," Proceedings of the JCDL 2002, Jul. 13-17, 2002, Portland, Oregon, ACM 1-58113-513-0/02/0007, pp. 56-64.

Neelamani, Ramesh, et al., "Adaptive Representation of JPEG 2000 Images Using Header-Based Processing," Proceedings of IEEE International Conference on Image Processing 2002, pp. 381-384.

Ogden, William, et al., "Document Thumbnail Visualizations for Rapid Relevance Judgments: When do they pay off?" TREC 1998, pp. 528-534, (1995) (7 pgs.).

Peairs, Mark, "Iconic Paper", Proceedings of 3rd ICDAR, '95, vol. 2, pp. 1174-1179 (1995) (3 pgs.).

Salton, Gerard, "Automatic Indexing," *Automatic Text Processing, The Transformation, Analysis, and Retrieval of Information by Computer*, Chapter 9, Addison Wesley Publishing Company, ISBN: 0-201-12227-8, 1989, 38 pages.

Secker, A., et al., "Highly Scalable Video Compression with Scalable Motion Coding," IEEE Transactions on Image Processing, vol. 13, Issue 8, Date: Aug. 2004, Digital Object Identifier: 10.1109/TIP. 2004.826089, pp. 1029-1041.

Woodruff, Allison, et al., "Using Thumbnails to Search the Web," Proceedings from SIGCHI 200, Mar. 31-Apr. 4, 2001, Seattle, WA, ACM 1-58113-327-8/01/0003, pp. 198-205.

World Wide Web Consortium, Document Object Model Level 1 Specification, ISBN-10; 1583482547, Iuniverse Inc, Sep. 2000.

(56) References Cited

OTHER PUBLICATIONS

Xie, Xing, et al., "Browsing Large Pictures Under Limited Display Sizes," IEEE Transactions on Multimedia, vol. 8 Issue: 4, Digital Object Identifier: 10.1109/TMM.2006.876294, Date: Aug. 2006, pp. 707-715.

Xie, Xing, et al., "Learning User Interest for Image Browsing on Small-Form-Factor Devices," Proceedings of ACM Conference Human Factors in Computing Systems, 2005, pp. 671-680.

"FestVOX," <http://festvox.org/voicedemos.html>, downloaded May 6, 2010, 1 page.

"ISO/IEC JTC 1/SC 29/WG 1 N1646R, (ITU-T SG8) Coding of Still Pictures, JBIG (Joint Bi-Level Image Experts Group)," JPEG—(Joint Photographic Experts Group), Mar. 16, 2000, Title: JPEG 2000 Part I Final Committee Draft Version 1.0, Source: ISO/IEC JTC1/SC29 WG1, JPEG 2000, Editor Martin Boliek, Co-Editors: Charilaos Christopoulous, and Eric Majani, Project: 1.29.15444 (JPEG 2000), 204 pages.

"Information Technology—Coding of Audio-Visual Objects—Part 2: Visual," ITU-T International Standard ISO/IEC 14496-2 Second Edition, Dec. 1, 2001 (MPEG4-AVC), Reference No. ISO/IEC 14496-2:2001(E), 536 pages.

Adobe, "PDF Access for Visually Impaired," <http://web.archive.org/web/20040516080951/http://www.adobe.com/support/salesdocs/10446.htm>, downloaded May 17, 2010, 2 pages.

Alam, H., et al., "Web Page Summarization for Handheld Devices: A Natural Language Approach," Proceedings of the 7th International Conference on Document Analysis and Recognition, 2003, pp. 1153-1157.

Berkner, Kathrin, et al., "SmartNails—Display and Image Dependent Thumbnails," Proceedings of SPIE-IS&T Electronic Imaging, SPIE vol. 5296 © 2004, SPIE and IS&T -0277-786X/04, Downloaded form SPIE Digital Library on Jan. 29, 2010 to 151.207.244.4, pp. 54-65.

Breuel, T., et al., "Paper to PDA," Proceedings of the 16th International Conference on Pattern Recognition, vol. 1, Publication Date: 2002, pp. 476-479.

Chen, F., et al., "Extraction of Indicative Summary Sentences from Imaged Documents," Proceedings of the Fourth International Conference on Document Analysis and Recognition, 1997, vol. 1, Publication Date: Aug. 18-20, 1997, pp. 227-232.

Eglin, V., et al., "Document Page Similarity Based on Layout Visual Saliency: Application to Query by Example and Document Classification," Proceedings of the 7th International Conference on Document Analysis and Recognition, 2003, Publication Date: Aug. 3-6, 2003, pp. 1208-1212.

Erol, B., et al., "Computing a Multimedia Representation for Documents Given Time and Display Constraints," Proceedings of ICME 2006, Toronto, Canada, 2006, pp. 2133-2136.

Erol, B., et al., "Multimedia Thumbnails for Documents," Proceedings of the MM'06, XP-002486044, [Online] URL: <http://www.stanford.edu/{sidj/papers/mmthumbs_acm.pdf>, ACM 1-59593-447-2/06/0010, Santa Barbara, California, Oct. 23-27, 2006, pp. 231-240.

Erol, B., et al., "Prescient Paper: Multimedia Document Creation with Document Image Matching," IEEE Proceedings of the 17th International Conference on Pattern Recognition, 2004, ICPR 2004, vol. 2, Downloaded on May 6, 2010, pp. 675-678.

European Patent Office Search Report for European Patent Application EP 08 152 937.2-1527, Jul. 9, 2008, 7 pages.

European Patent Office Search Report for European Patent Application EP 08 152 937.2-1527, Jun. 8, 2009, 4 pages.

European Patent Office Search Report for European Patent Application EP 08153000.8-1527, Oct. 7, 2008, 7 pages.

Japanese Application No. 2007-056061, Office Action, Date Stamped Sep. 3, 2011, 2 pages [Japanese Translation].

* cited by examiner

COARSE-TO-FINE NAVIGATION THROUGH PAGINATED DOCUMENTS RETRIEVED BY A TEXT SEARCH ENGINE

TECHNICAL FIELD

This invention relates to the field of text search and, in particular, to visualization of text search results.

BACKGROUND

Desktop search technology has gained a lot of interest in recent years. Standard technology behind desktop search engines is a text retrieval engine. That means text is extracted from files, this text indexed and a search of a query term against indexed terms is performed. Text is typically extracted without pagination information (this may be due to historical adaptation of web search technology to desktop files). In a typical search scenario, a list of matched results is returned, sorted in order of the score assigned by the search engine, alphabetically by file name or by application. With increasing amounts of files on a personal desktop, the lists of returned results can become less informative. Often the user asks the question "why was this document received" without getting an answer to this question through the representation of the search results.

One important class of documents includes paginated documents (i.e. formatted documents), represented by file formats such as "pdf" or "doc". Those documents may have been created electronically or may be sent to the desktop or a local file storage system through a scanner. In this case, an optical character recognition (OCR) process may have to be performed in order to be able to create a searchable index.

Furthermore, navigation through multi-page documents that are displayed in a list as a result of a search query is currently not possible without selecting a document, opening up the application in which the document was written or formatted, and navigating through pages using the application controls, perhaps performing a second search for the same term inside the application. For a search engine embedded into a multi-function peripheral (MFP) that would mean that state-of-the-art document processing applications would have to be implemented in addition to a search engine.

SUMMARY

A method and apparatus for creating coarse-to-fine navigation through paginated documents retrieved by a text search engine is described. In one embodiment, the method comprising: receiving a query term; generating a first set of results based on the query term using a database storing a plurality of documents, and an index of the plurality of documents, where each document has at least one structural element; retrieving a plurality of structural elements associated the first set of results; and generating a second set of results based a predefined relationship between the plurality of structure elements and the query term; and displaying the second set of results.

BRIEF DESCRIPTION OF THE DRAWINGS

The present invention is illustrated by way of example, and not by way of limitation, in the figures of the accompanying drawings.

DETAILED DESCRIPTION

Figure 1:
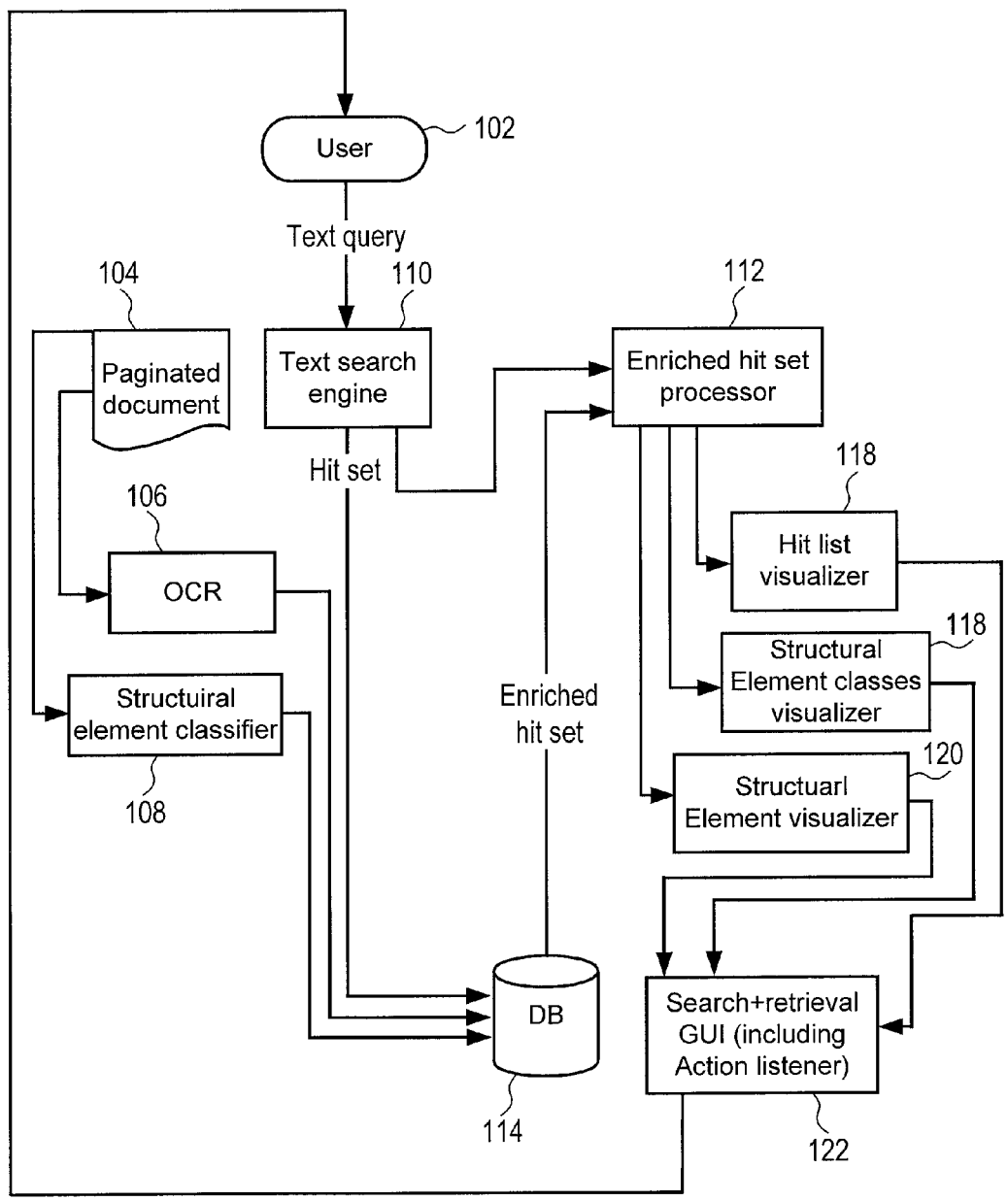
FIG. 1 is a block diagram illustrating one embodiment of a search and retrieval system for paginated documents.

Methods and apparatuses for coarse-to-fine navigation of the results of paginated documents retrieved by a text search engine are described. In one embodiment, a search system for electronic documents operates with one text search engine and a database of bitmaps or images of documents pages and parts of pages (also known as structural elements). The search system gives the ability to a user to "look inside" a document to get a better understanding of where the query term hits occurred.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of the present invention include various operations, which will be described below. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application)

readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

FIG. 1 is a block diagram illustrating one embodiment of a search and retrieval system for paginated documents. Paginated documents 104 are scanned through an OCR process 106 and through a structural element classifier 108. OCR process 106 provides searchable text in an electronic format. Structural element classifier 108 defines the class of the structural elements of the scanned paginated document 104. For example, a paginated document may include a title, a body text, and a drawing, and a caption for the drawing. In one embodiment, OCR process 106 extracts the text of the title, the text of the body text, and the text of the caption. In one embodiment, structural element classifier 108 classifies the drawing as a drawing structure element, the body text as a text structural element. Structural element classifier 108 may be any of the structural element classifiers described in U.S. patent application Ser. No. 10/354,811, entitled "Reformatting Documents Using Document Analysis Information," filed Jan. 29, 2003, published Jul. 29, 2004 (Publication No. US 2004/0146199 A1); U.S. patent application Ser. No. 10/435,300, entitled "Resolution Sensitive Layout of Document Regions," filed May 9, 2003, published Jul. 29, 2004 (Publication No. US 2004/0145593 A1); U.S. patent application Ser. No. 11/023,142, entitled "Semantic Document Smartnails," filed Dec. 22, 2004, published Jun. 22, 2006 (US 2006-0136491 A1); U.S. patent application Ser. No. 11/018,231, entitled "Creating Visualizations of Documents," filed on Dec. 20, 2004; and U.S. patent application Ser. No. 11/332,533, entitled "Methods for Computing a Navigation Path," filed on Jan. 13, 2006 and incorporated here by reference.

Examples of other structural elements include, but are not limited to, a body text paragraph element, a graphic element, a photographic element, a figure element. Each structural element may further include additional classes. For example, the body text paragraph element may include a title unit, an author unit, a publisher name unit, a reference unit, and a footnote unit. The graphic element may include a block diagram, a bar chart, an organization chart, a logo.

The text from the OCR process 106 and the structural elements from the structural element classifier 108 are stored in a database 114. In one embodiment, each structural element is stored in the database 114 as an image bitmap. Corresponding metadata may be attached to each image bitmap. In one embodiment, the metadata describes the structure element type (e.g. a text, a graphic, a photo, etc . . . ) as well as crop coordinates in the original page image. In one embodiment, database 114 may include an index of its content. The metadata also has an index and is thus searchable.

A user 102 provides a search term, or a text query term, to a text search engine 110. In accordance with another embodiment, a search field is provided to text search engine 110 to limit and narrow the scope of the search. Text search engine 110 may have access to the index in database 114. As previously described, in one embodiment, database 114 stores images of pages and structural elements.

Given the search term and the search field, text search engine 110 retrieves all documents files that contain that search term in the index in the specified field. This traditional output of collection of files may be called a "hit set."

An enriched hit set processor 112 uses the hit set from text search engine 110 to query database 114 of structural elements in the hit set. The enriched hit set processor 112 retrieves the structural elements that have a previously specified (or predefined) relationship with the search term and the hit set. The relationships may have been defined by the user or another party such as a IT service person or through metadata in database 114 that were created during use of the structural element classifier. Relationships between the search term and a structural element may include whether the search term occurs in an area covered by a graphic element whether the search term occurs in a figure caption element, a title element or a reference element, whether the term occurs near a photographic element or a graphic element.

Pairs of the search term and retrieved structural element form an enriched hit set and are returned to the enriched hit set processor 112. In one embodiment, enriched hit set processor 112 calculates further parameters of the enriched hit set, such as numbers of term hits per document, numbers of term hit per document per structural element class. In one embodiment, the enriched bit set may include any or all of the following:

with respect to a document: number of pages, total number of query term hits; file name, text summary:

with respect to a page: a bit map of page; a number of hits, location of hits, font characteristics of hit;

with respect to structural element classes: text, graphics, photos;

with respect to individual structural element on page: bitmaps of text, graphic, photo zone; and number of hits in vicinity of structural element, location and font characteristics of hits.

In one embodiment, the results of enriched hit set processor 112 are sent to various visualization modules: a hit list visualizer module 116, a structural element class visualizer module 118, and a structural element visualizer module 120. The visualization modules are further discussed below.

In one embodiment, the outputs of visualization modules 116, 118, 120 are sent into a GUI representation 122 forming the retrieval interface visible to the user 102. In one embodiment, user input detectors may be included to allow user 102 to perform GUI actions, such as clicking, drag and drop, or mouse hover-over.

In one embodiment, visualization modules include sub-modules 116, 118, and 120. Each visualization module works on a specific level of the structural hit set hierarchy, e.g. document level, page level, structural element class level, or the individual structural element level.

Figure 6:
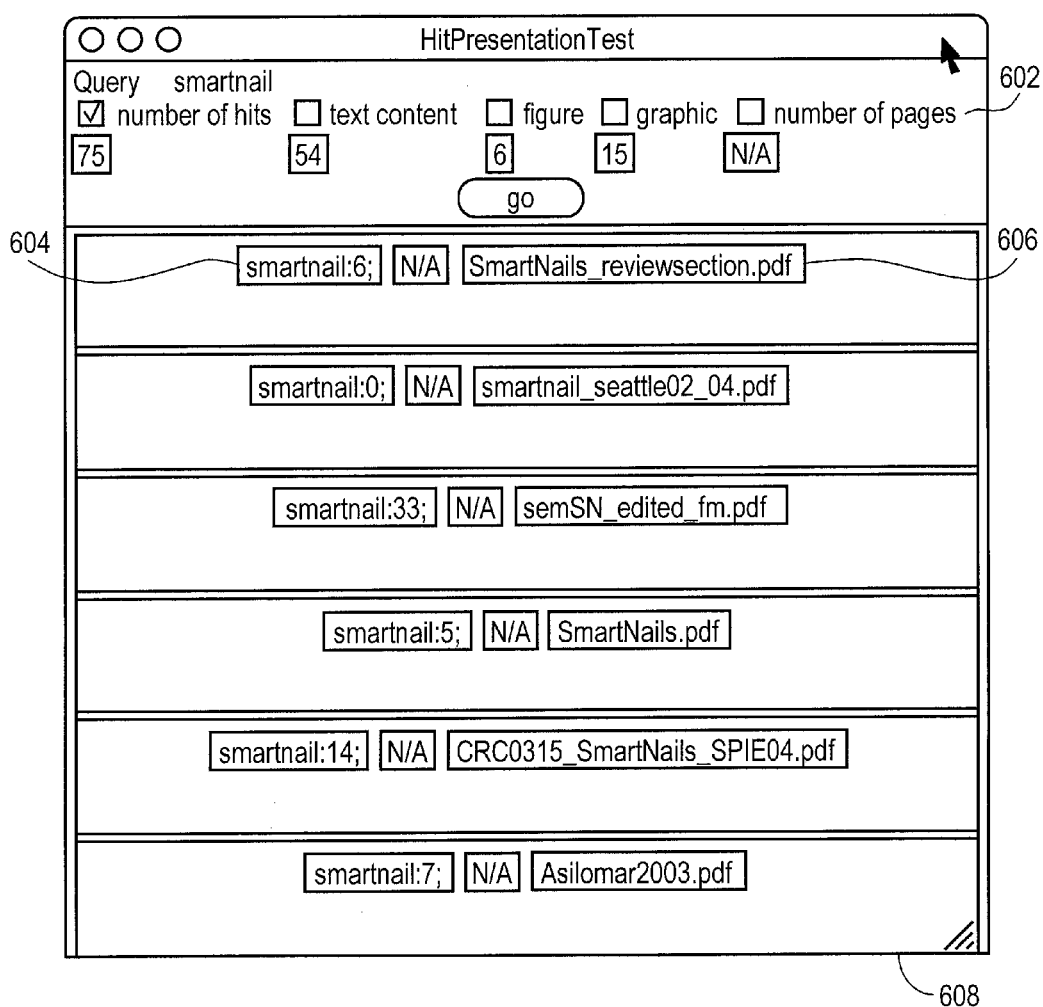
FIG. 6 is a diagram illustrating an example of a display at a document level in accordance with one embodiment.

Hit list visualizer module 116 may generate a document level display. FIG. 6 illustrates one example of such document level display 608. The display may include a file name 606, a number of hits 604 found in a document of a particular search term (the term "smartnail" in this example), a text summary containing the search terms, and application icons. In addition, the number of hits found in a document could be indicated either by a number or a score bar. In one embodiment, the absolute relevance score is computed by the search engine and also displayed. In one embodiment, the structural element classes 602 are displayed as selectable fields. In FIG. 6, the user has requested the search engine to search for the term "smartnail" and to display according to the number of hits in total. If the "text context", "figure", "graphic" or "number of pages" box is checked, the number of hits 604 of the search term(s) that appear in that category is shown. For example, if the "figure" box is checked, then the number of hits 604 shows the number of times the term(s) ("smartnail" in this example) appears in a figure.

Figure 7:
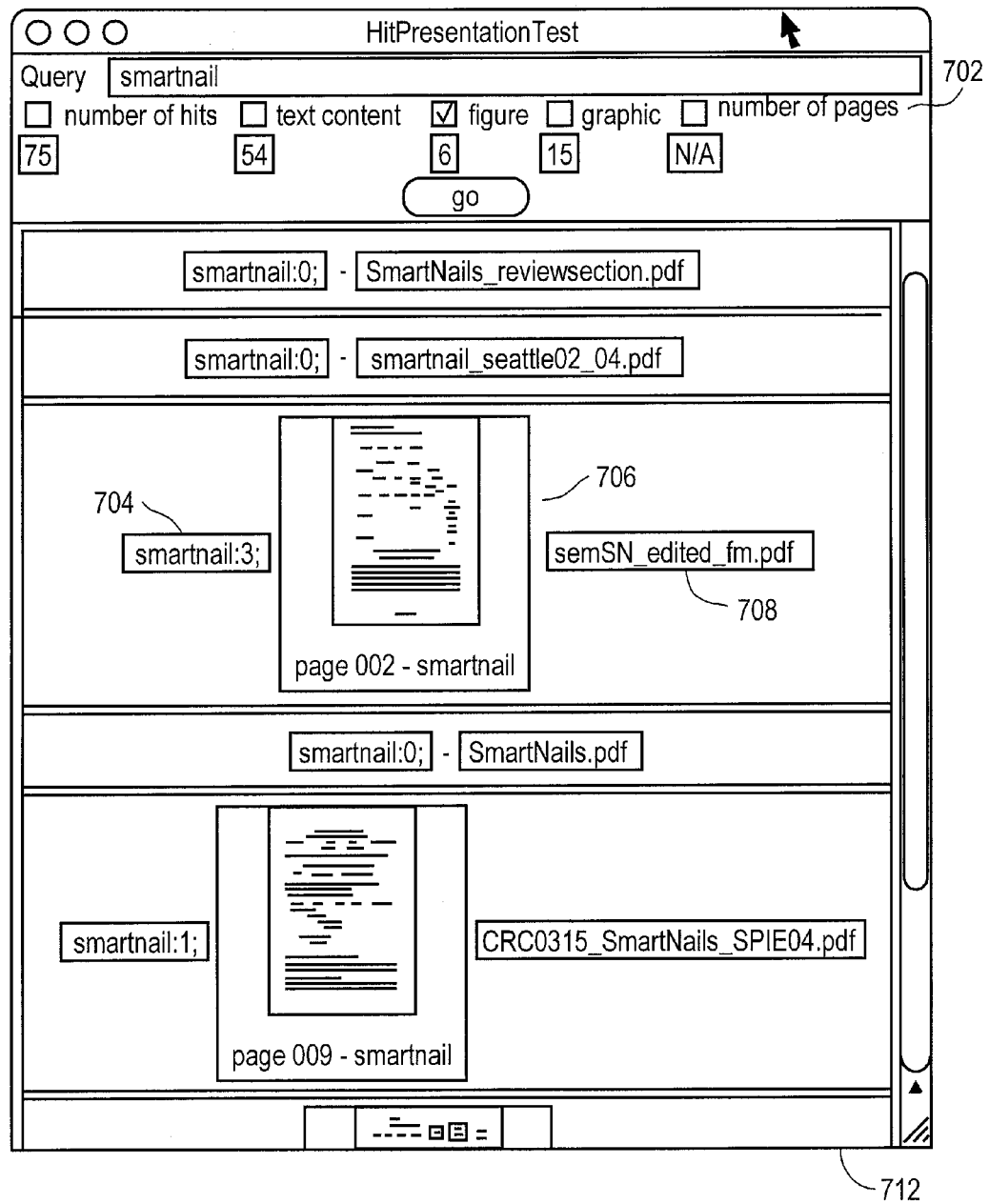
FIG. 7 is a diagram illustrating an example of a display at a structural element class level in accordance with one embodiment.

Structural element class visualizer module 118 may generate a structural element class level display. FIG. 7 illustrates one example of such structural element class level display 712. The user may have a choice to select one or more of the available structural classes 702. In response to the selections thumbnails pages 706 containing the selected classes 702 may be shown. The available selection of structural element classes may be indicated by a list of check boxes as illustrated in FIG. 7. FIG. 7 also displays the page containing the first occurrence of the query term in a figure caption as a thumbnail (706) in addition to the filename. In one embodiment, pages that include the query term hits can also form a slide show in the thumbnail window.

Figure 4:
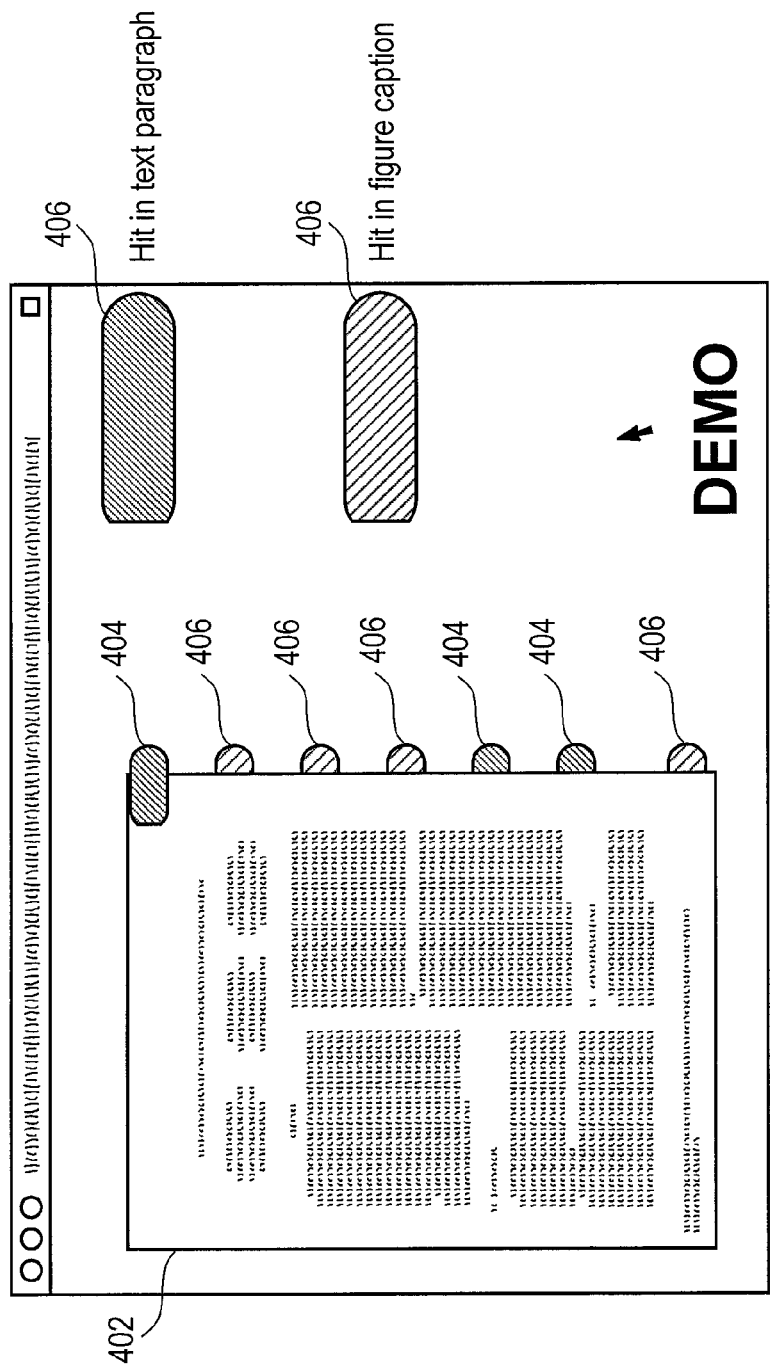
FIG. 4 is a diagram illustrating an example of a tagged thumbnail display in accordance with one embodiment.

In another embodiment, the available selection of structural element classes may be indicated as visual tags added to the thumbnail of the first page of a document as illustrated in FIG. 4.

FIG. 4 is a diagram illustrating an example of a tagged thumbnail display in accordance with one embodiment. The visualization is at the structural element class level. Page locations in a document where the query term "smartnail" is found may be indicated via colored tags. In one embodiment, different colors or patterns indicate different structural element classes. Such a navigation thumbnail may be shown in addition to the filename in the document-level hit list.

A visualization can be static (e.g., a single image only), interactive via user input (e.g., a tagged thumbnail), or animated automatically (e.g. as a slide show or video clip containing pages or structural elements containing the query term hit). In the case of animation, the user may initiate playing of the slideshow or video clip by hitting a play button displayed on the screen.

Figure 5:
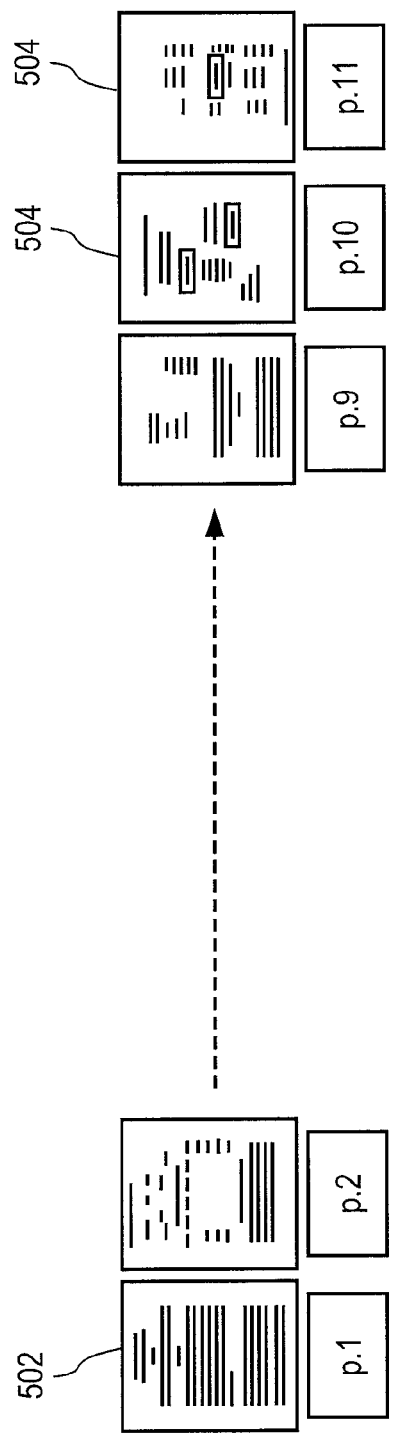
FIG. 5 is a diagram illustrating an example of a smartnail display in accordance with one embodiment.

FIG. 5 is a diagram illustrating an example of a display in accordance with one embodiment. Visualization is at the page or structural element class level. Page locations in a document where the query term "smartnail" is found are indicated via page thumbnails 502. Such a page-chain of thumbnails 502 may be shown in addition to the filename in the document-level hit list. Thus, a "page-chain" of thumbnails 502 may be created reflecting where the shown pages containing hits 504 of a selected element class. In one embodiment, the thumbnails 502 are smart thumbnails (smartnails) as set forth in U.S. patent application Ser. No. 10/354,811, entitled "Reformatting Documents Using Document Analysis Information," filed Jan. 29, 2003, published Jul. 29, 2004 (Publication No. US 2004/0146199 A1), U.S. patent application Ser. No. 10/435,300, entitled "Resolution Sensitive Layout of Document Regions," filed May 9, 2003, published Jul. 29, 2004 (Publication No. US 2004/0145593 A1) and U.S. patent application Ser. No. 11/023,142, entitled "Semantic Document Smartnails," filed Dec. 22, 2004 (Publication No. 20060136491 A1).

Figure 8:
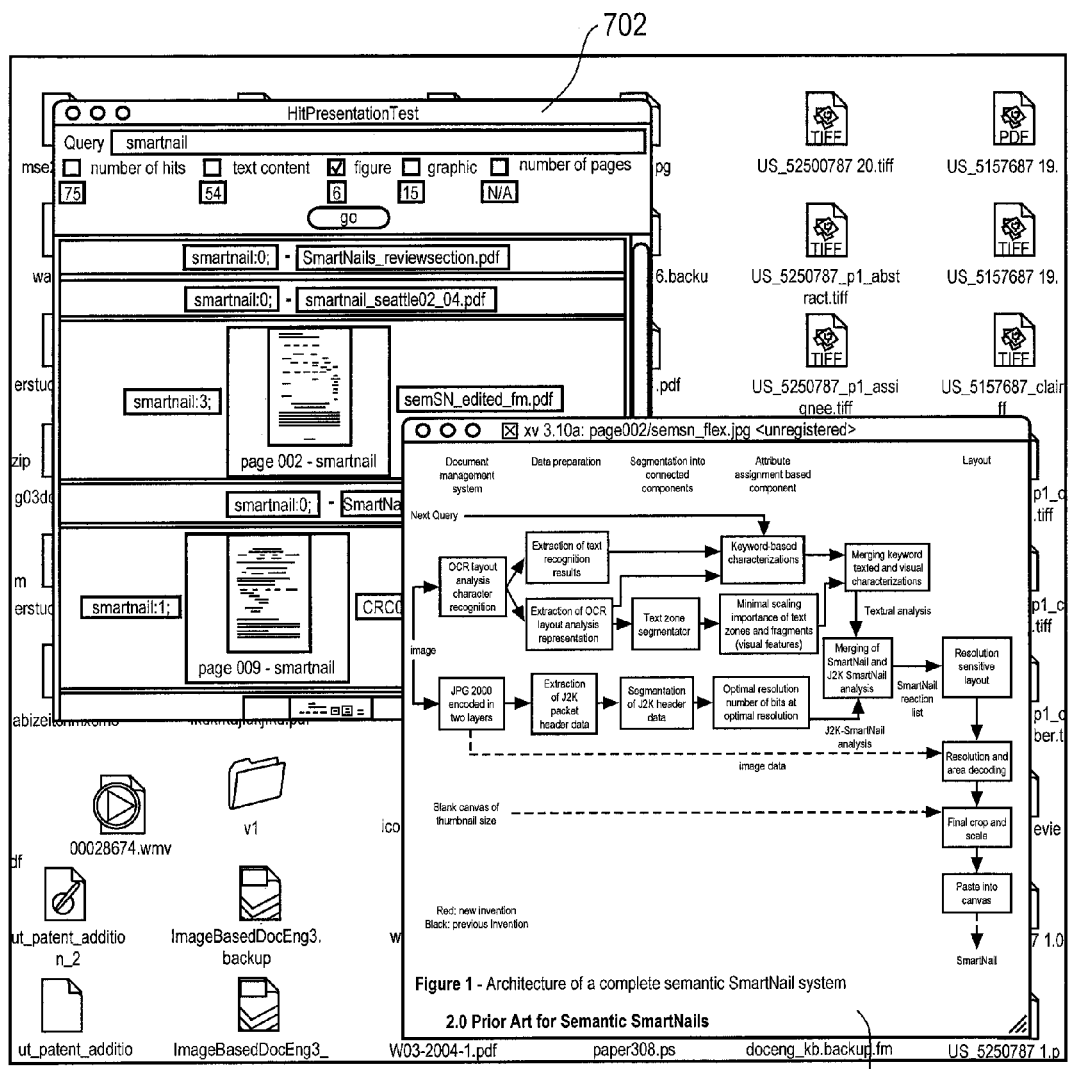
FIG. 8 is a diagram illustrating an example of a display at an individual structural element level in accordance with one embodiment.

In one embodiment, structural element visualizer module 120 generates a structural element level display. FIG. 8 is a diagram illustrating an example of a display at the individual structural element level. On the individual structural element level, an image 802 is created that contains the structural element and the element that contains the query term. For example, if a query term is found inside of a graphic, then a bitmap image of the graphic is shown with the query term highlighted. The size of the image 802 showing the structural element depends on the font characteristics of the associated text matching the query term. In one embodiment, the scaling parameter for the bitmap image is computed such that a readable font size for the query term inside the element is assured. For example, if the original bitmap image size is 1000×500 pixels, the font size of the query ten in pixels is 20, and the minimal font size is set to 8 pixels, then the scaling factor applied to the bitmap image is 8/20=2/5. That means the scaled image presented to the user has dimensions of 400×200 pixels. This image could be displayed in response to a mouse over action on a page thumbnail showing the page containing the structural element, on a document level display 702. This scaling is described in see U.S. patent application Ser. No. 10/354,811, entitled "Reformatting Documents Using Document Analysis Information," filed Jan. 29, 2003, published Jul. 29, 2004 (Publication No. US 2004/0146199 A1); U.S. patent application Ser. No. 10/435,300, entitled "Resolution Sensitive Layout of Document Regions," filed May 9, 2003, published Jul. 29, 2004 (Publication No. US 2004/0145593 A1); and U.S. patent application Ser. No. 11/023,142, entitled "Semantic Document Smartnails," filed Dec. 22, 2004, published Jun. 22, 2006 (US 2006-0136491 A1).

In accordance with another embodiment, in the case where the search term occurs close to an element that does not only contain text (e.g., a photo, a table, etc.) a scaling factor is first calculated for the query hit as described in the previous paragraph. Then the same scaling factor is used to scale the non-pure-text element (e.g., photo or table). For example, the query hit can occur in the figure caption of a figure. The figure consists of the text caption and a photo. Then the scaling factor is computed for the query hit term in the caption, then applied to the photo element of the figure as well. A similar example is a table with a query hit in the table heading. The scaling factor is computed for the query term hit in the heading, then the entire table is scaled by the same scaling factor. The photo element is then scaled by the same amount. Both elements are composited into a final image using crop, scale, and paste operations.

A window next to the list of search results may be added that contains the information considered to be relevant for the search by the computer—i.e., a relevance memory window. This window displays what the computer considered to be relevant information entered by the user, including for example, the search field, the search query, what visualization was selected, etc.

Figure 2:
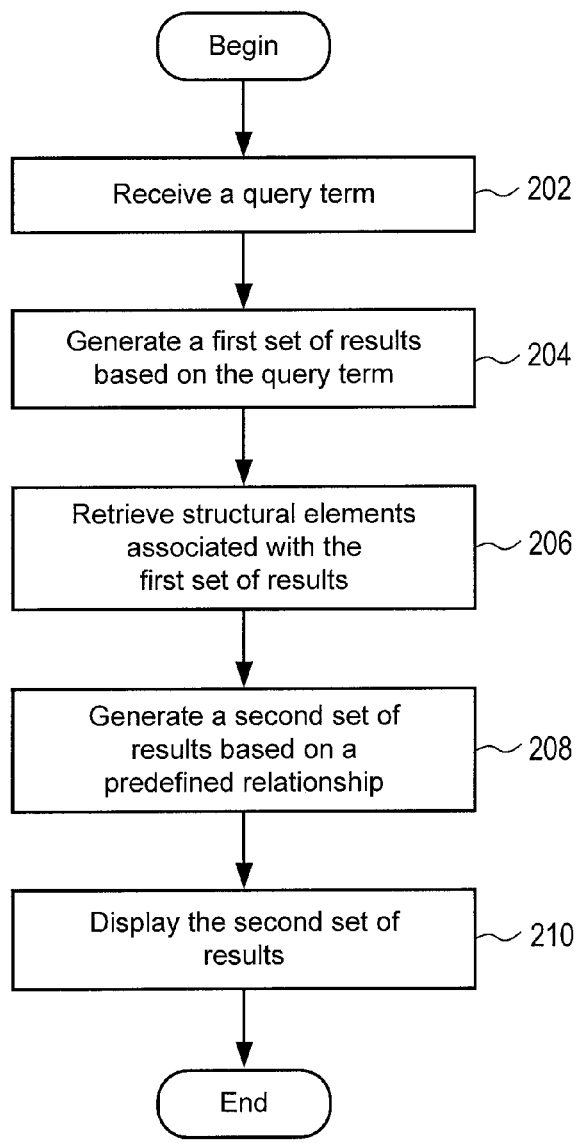
FIG. 2 is a flow diagram of one embodiment of a process for performing a search and for displaying the results of the search.

FIG. 2 is a flow diagram of one embodiment of a process for performing a search and for displaying the results of the search. The process may be performed by processing logic that may comprise hardware (circuitry, dedicated logic, etc.), software (such as is run on a general purpose computer system or a dedicated machine), or a combination of both.

Referring to FIG. 2, at processing block 202, processing logic receives a query term. At processing block 204, processing logic generates a first set of results based on the query term using a database storing documents (including paginated documents), and generates an index of the documents. Each document has at least one structural element as discussed above. At processing block 206, processing logic retrieves structural elements associated with the first set of results. At processing block 208, processing logic generates a second set of results based a predefined relationship between the structure elements and the query term. At processing block 210, processing logic displays and visualizes the second set of results. This may be done using the above described modules 116, 118, and 120.

In accordance with one embodiment, displaying the second set of results further comprises displaying a file name and a corresponding hit count for the query term in the document having the file name.

In accordance with another embodiment, displaying the second set of results further comprises displaying a file name, a corresponding hit count for the query term in the structural element of the document having the file name, and a corresponding image of a portion of the structural element of the document based on the predefined relationship.

In accordance with another embodiment, displaying the second set of results further comprises displaying an enlarged image of a corresponding image of a portion of the structural element of a document based on the predefined relationship such that the query term is readable in the enlarged image.

Figure 3:
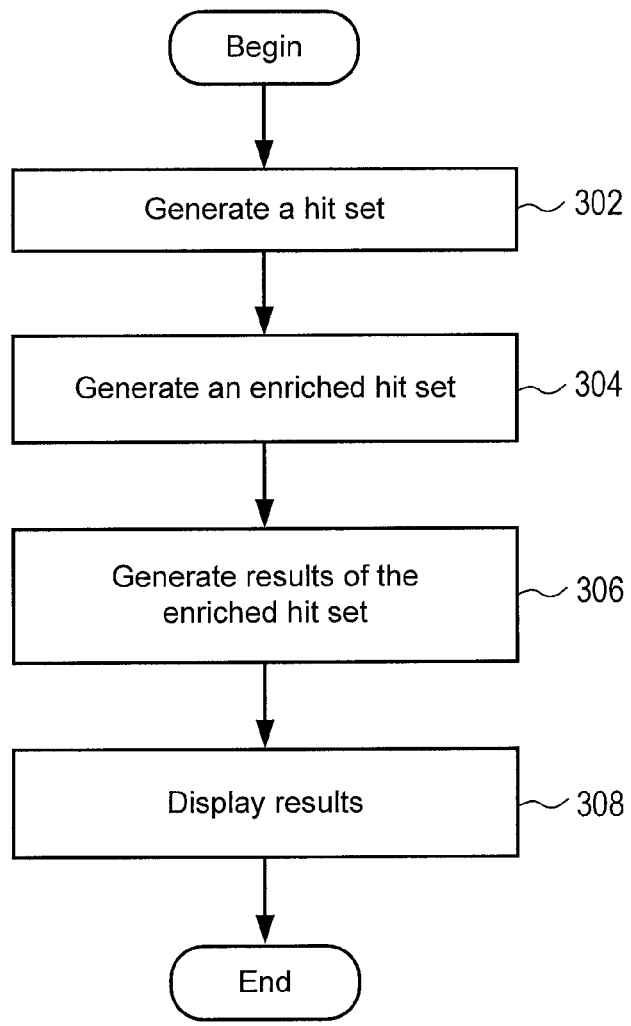
FIG. 3 is a flow diagram of another embodiment of a process for performing a search and for displaying the results of the search.

FIG. 3 is a flow diagram of another embodiment of a method for performing a search and for displaying the results of the search. The process is performed by processing logic that may comprise hardware (circuitry, dedicated logic, etc.), software (such as is run on a general purpose computer system or a dedicated machine), or a combination of both.

Referring to FIG. 3, at processing block 302, processing logic generates a hit set as previously described with respect to FIG. 1. At processing block 304, processing logic generates an enriched hit set as previously described with respect to FIG. 1. Then processing logic generates the results of the enriched hit set (processing block 306) and displays the results (processing block 308).

An Example of a Multifunction Peripheral (MFP)

Figure 10:
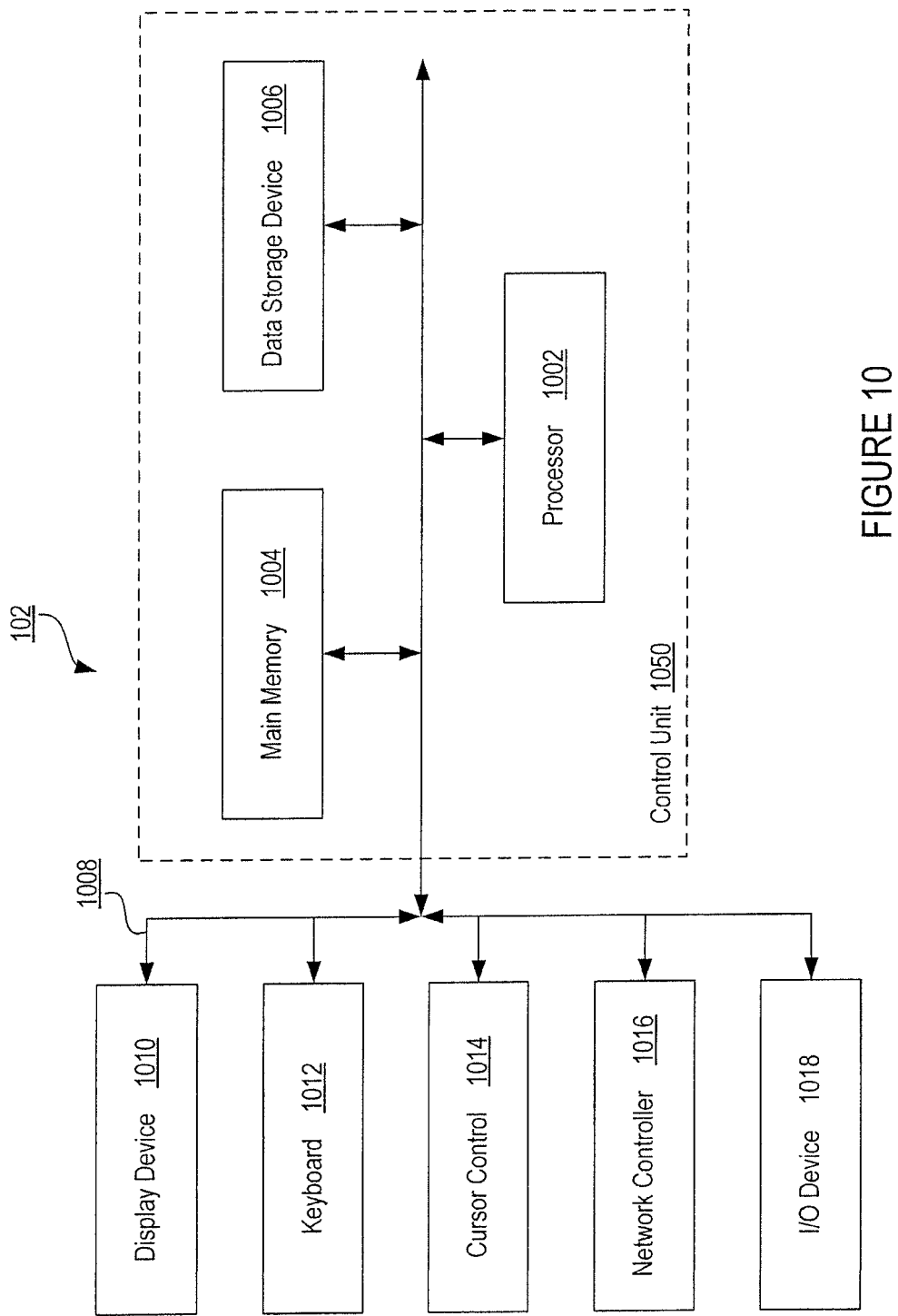
FIG. 10 is a block diagram of one embodiment of a MFP in accordance with an embodiment of the present invention.

In one embodiment, the searching technique described above is implemented into a multi-function peripheral (MFP). FIG. 10 is a block diagram of one embodiment of a MFP in accordance with an embodiment of the present invention. The MFP preferably comprises a control unit 1050, a display device 1010, a keyboard 1012, a cursor control device 1014, a network controller 1016 and one or more input/output (I/O) device(s) 1018.

Control unit 1050 may comprise an arithmetic logic unit, a microprocessor, a general purpose computer, a personal digital assistant or some other information appliance equipped to provide electronic display signals to display device 1010. In one embodiment, control unit 1050 comprises a general purpose computer having a graphical user interface, which may be generated by, for example, a program written in Java running on top of an operating system like WINDOWS® or UNIX® based operating systems. In one embodiment, one or more application programs are executed by control unit 1050 including, without limitation, word processing applications, electronic mail applications, financial applications, and web browser applications.

Still referring to FIG. 10, the control unit 1050 is shown including processor 1002, main memory 1004, and data storage device 1006, all of which are communicatively coupled to system bus 1008.

Processor 1002 processes data signals and may comprise various computing architectures including a complex instruction set computer (CISC) architecture, a reduced instruction set computer (RISC) architecture, or an architecture implementing a combination of instruction sets. Although only a single processor is shown in FIG. 10, multiple processors may be included.

Main memory 1004 stores instructions and/or data that may be executed by processor 1002. The instructions and/or data may comprise code for performing any and/or all of the techniques described herein. Main memory 1004 may be a dynamic random access memory (DRAM) device, a static random access memory (SRAM) device, or some other memory device known in the art. The memory 1004 is described in more detail below with reference to FIGS. 5 and 6.

Data storage device 1006 stores data (e.g., image data) and instructions for processor 1002 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 1008 represents a shared bus for communicating information and data throughout control unit 1050. System bus 1008 may represent one or more buses including an industry standard architecture (ISA) bus, a peripheral component interconnect (PCI) bus, a universal serial bus (USB), or some other bus known in the art to provide similar functionality. Additional components coupled to control unit 1050 through system bus 1008 include the display device 1010, the keyboard 1012, the cursor control device 1014, the network controller 1016 and the I/O device(s) 1018.

Display device 1010 represents any device equipped to display electronic images and data as described herein. Display device 1010 may be, for example, a cathode ray tube (CRT), liquid crystal display (LCD), or any other similarly equipped display device, screen, or monitor. In one embodiment, display device 1010 is equipped with a touch screen in which a touch-sensitive, transparent panel covers the screen of display device 1010.

Keyboard 1012 represents an alphanumeric input device coupled to control unit 1050 to communicate information and command selections to processor 1002. The Keyboard 1012 can be a QWERTY keyboard, a key pad, or representations of such created on a touch screen.

Cursor control 1014 represents a user input device equipped to communicate positional data as well as command selections to processor 1002. Cursor control 1014 may include a mouse, a trackball, a stylus, a pen, a touch screen, cursor direction keys, or other mechanisms to cause movement of a cursor.

Network controller 1016 links control unit 1050 to a network 208 that may include multiple processing systems. The network of processing systems may comprise a local area network (LAN), a wide area network (WAN) (e.g., the Internet), and/or any other interconnected data path across which multiple devices may communicate. The control unit 1050 also has other conventional connections to other systems such as a network for distribution of files (media objects) using standard network protocols such as TCP/IP, http, https, and SMTP as will be understood to those skilled in the art.

One or more I/O devices 1018 are coupled to the system bus 1008. For example, the I/O device 1018 includes an image scanner and document feeder for capturing an image of a document. The I/O device 1018 also includes a printer for generating documents. The I/O device 1018 may also include audio input/output device equipped to receive audio input via a microphone and transmit audio output via speakers. In one embodiment, audio device is a general purpose; audio add-in/expansion card designed for use within a general purpose computer system. Optionally, I/O audio device may contain one or more analog-to-digital or digital-to-analog converters, and/or one or more digital signal processors to facilitate audio processing.

It should be apparent to one skilled in the art that evolutionary multi-function printer 102 may include more or less components than those shown in FIG. 10 without departing from the spirit and scope of the present invention. For example, evolutionary multi-function printer 102 may include additional memory, such as, for example, a first or second level cache, or one or more application specific integrated circuits (ASICs). Similarly, additional components input/output devices 1018 may be coupled to control unit 1050 including, for example, an RFID tag reader, digital still or video cameras, or other devices that may or may not be equipped to capture and/or download electronic data to control unit 1050. One or more components could also be eliminated such as cursor control 1014.

An Example of a Computer System

Figure 9:
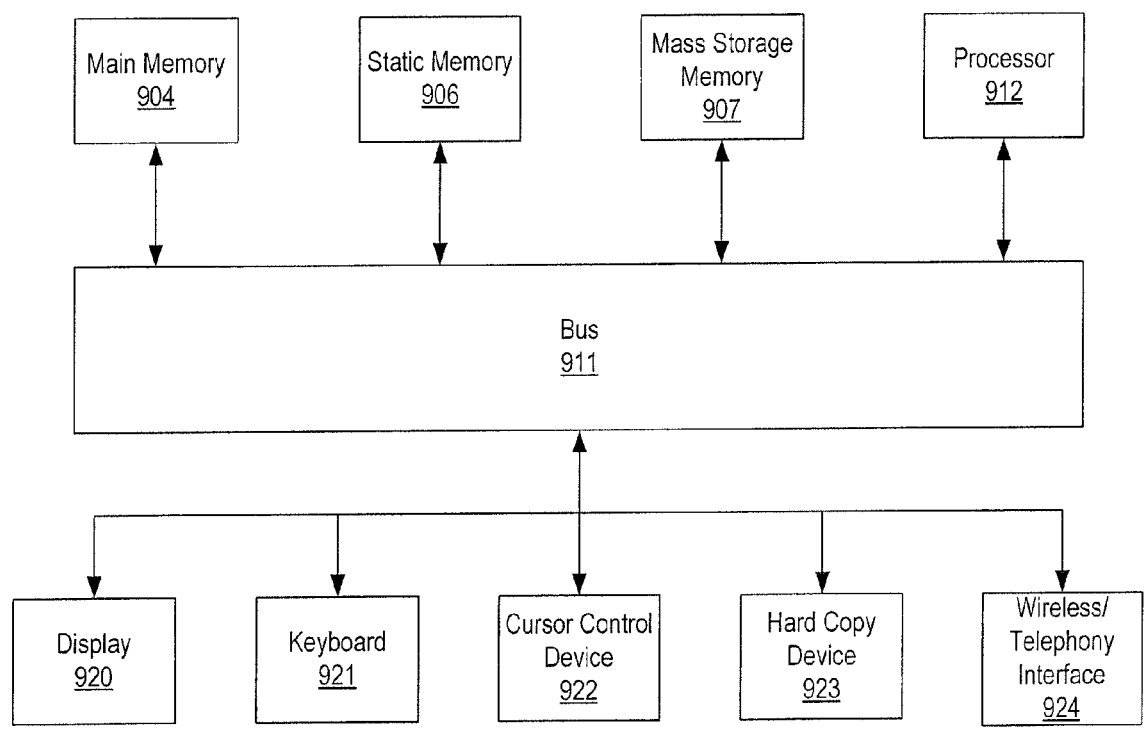
FIG. 9 illustrates an exemplary computer system.

FIG. 9 is a block diagram of an exemplary computer system that may perform one or more of the operations described herein. Referring to FIG. 9, computer system 900 may comprise an exemplary client or server computer system. Computer system 900 comprises a communication mechanism or bus 911 for communicating information, and a processor 912 coupled with bus 911 for processing information. Processor 912 includes a microprocessor, but is not limited to a microprocessor, such as, for example, Pentium™, PowerPC™, Alpha™, etc.

System 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912.

Computer system 900 also comprises a read only memory (ROM) and/or other static storage device 906 coupled to bus 911 for storing static information and instructions for processor 912, and a data storage device 907, such as a magnetic disk or optical disk and its corresponding disk drive. Data storage device 907 is coupled to bus 911 for storing information and instructions.

Computer system 1000 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for marking information on a medium such as paper, film, or similar types of media. Another device that may be coupled to bus 911 is a wired/wireless communication capability 925 to communication to a phone or handheld palm device.

Note that any or all of the components of system 900 and associated hardware may be used in the present invention. However, it can be appreciated that other configurations of the computer system may include some or all of the devices.

The presently described visualization system assists the user to navigate through a set of files returned from a retrieval engine as response to a search text query. The multi-page documents file navigation includes access into the individual pages and structural elements inside a page. As a result, the user gets an understanding of where in the document a search term hit was found by the search engine.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
 receiving a query term;
 generating, with a processor, a first set of results based on the query term using a database storing a plurality of documents, and an index of the plurality of documents, each document having structural elements corresponding to images of pages or images of portions of pages within each document;
 retrieving, with the processor, a plurality of structural elements associated with one or more paginated documents in the first set of results;
 generating, with the processor, a second set of results based on a search of metadata that describes the plurality of structural elements, the search based on a predefined relationship between the plurality of structural elements in the one or more paginated documents and the query term;
 displaying the second set of results along with an image of each structural element in the set of results illustrating an instance of the query term as it appears in each structural element; and
 displaying a scaled image corresponding to a portion of a structural element of a search result in the second set of results, wherein the scaled image is scaled by a scaling parameter that is based at least in part on a font size of the query term in the portion of a structural element and a minimal font size in the scaled image, wherein the query term is visually distinguished in the scaled image.

2. The method of claim 1 wherein displaying the second set of results further comprises:
 displaying a text representation and a corresponding hit count for the query term in the document having the text representation.

3. The method defined in claim 2 wherein the text representation is one of a group consisting of a file name of the document and a sentence in the document.

4. The method of claim 1 wherein displaying the second set of results further comprises:
 displaying a text representation, a corresponding hit count for the query term in the structural element of the document having the text representation, and a corresponding image of a portion of the structural element of the document based on the predefined relationship.

5. The method defined in claim 4 wherein the text representation is one of a group consisting of a file name of the document and a sentence in the document.

6. The method of claim 1 further comprising:
 displaying a relevance memory window showing a machine-relevant search information.

7. The method of claim 1 wherein each structural element comprises a body text section, a graphical section, or a photographic section.

8. The method of claim 1 wherein each structural element is stored in the database as an image bitmap associated with a corresponding metadata, the corresponding metadata further comprising a type of the structural element, and a coordinate in a page image of a corresponding document.

9. The method of claim 1 wherein the predefined relationship comprises whether the query term is included in a graphical section of a document in the first set of results.

10. The method of claim 1 wherein the predefined relationship comprises whether the query term is included in a title section, a figure section, a caption section, or a reference section of a document in the first set of results.

11. The method of claim 1 wherein the predefined relationship comprises whether the query term is included in a photographic element or a graphic element of a document in the first set of results.

12. A non-transitory computer readable storage medium storing instructions thereon which, when executed by a system, cause the system to perform a method comprising:
   receiving a query term;
   generating a first set of results based on the query term using a database storing a plurality of documents, and an index of the plurality of documents, each document having structural elements corresponding to images of pages or images of portions of pages within each document;
   retrieving a plurality of structural elements associated with one or more paginated documents in the first set of result;
   generating a second set of results based on a search of metadata that describes the plurality of structural elements, the search based on a predefined relationship between the plurality of structural elements in the one or more paginated documents and the query term;
   displaying the second set of results along with an image of each structural element in the set of results illustrating an instance of the query term as it appears in each structural element; and
   displaying a scaled image corresponding to a portion of a structural element of a search result in the second set of results, wherein the scaled image is scaled by a scaling parameter that is based at least in part on a font size of the query term in the portion of a structural element and a minimal font size in the scaled image, wherein the query term is visually distinguished in the scaled image.

13. The computer readable storage medium of claim 12 wherein displaying the second set of results further comprises:
   displaying a text representation and a corresponding hit count for the query term in the document having the text representation.

14. The computer readable storage medium of claim 12 wherein displaying the second set of results further comprises:
   displaying a text representation, a corresponding hit count for the query term in the structural element of the document having the text representation, and a corresponding image of a portion of the structural element of the document based on the predefined relationship.

15. The computer readable storage medium of claim 12 wherein the method further comprises:
   displaying a relevance memory window showing a machine-relevant search information.

16. The computer readable storage medium of claim 12 wherein each structural element comprises a body text section, a graphical section, or a photographic section.

17. The computer readable storage medium of claim 12 wherein each structural element is stored in the database as an image bitmap associated with a corresponding metadata, the corresponding metadata further comprising a type of the structural element, and a coordinate in a page image of a corresponding document.

18. The computer readable storage medium of claim 12 wherein the predefined relationship comprises whether the query term is included in a graphical section of a document in the first set of results.

19. The computer readable storage medium of claim 12 wherein the predefined relationship comprises whether the query term is included in a title section, a figure section, a caption section, or a reference section of a document in the first set of results.

20. The computer readable storage medium of claim 12 wherein the predefined relationship comprises whether the query term is included in a photographic element or a graphic element of a document in the first set of results.

21. An apparatus comprising:
   a memory; and
   a processor coupled with the memory over a bus to execute
      a search engine to generate a first set of results based on a query term using a database storing a plurality of documents, and an index of the plurality of documents, each document having structural elements corresponding to images of pages or images of portions of pages within each document, to retrieve a plurality of structural elements associated with one or more paginated documents in the first set of results, and to generate a second set of results based on a search of metadata that describes the plurality of structural elements, the search based on a predefined relationship between the plurality of structural elements in the one or more paginated documents and the query term,
      a visualization module to display the second set of results along with an image of each structural element in the set of results illustrating an instance of the query term as it appears in each structural element, and
      a structural class visualizer module, the structural class visualizer module to generate a display of a scaled image corresponding to a portion of a structural element of a search result in the second set of results, wherein the scaled image is scaled by a scaling parameter that is based at least in part on a font size of the query term in the portion of a structural element and a minimal font size in the scaled image, wherein the query term is visually distinguished in the scaled image.

22. The apparatus of claim 21 wherein the visualization module further comprises a hit list visualizer module, the hit list visualizer module is to generate a display of a text representation and a corresponding hit count for the query term in the document having the text representation.

23. The apparatus of claim 21 wherein the visualization module further comprises a structural element class visualizer module, the structural element class visualizer module is to generate a display of a text representation, a corresponding hit count for the query term in the structural element of the document having the text representation, and a corresponding image of a portion of the structural element of the document based on the predefined relationship.

24. The apparatus of claim 21 wherein the visualization module is to further display a relevance memory window showing a machine-relevant search information.

25. The apparatus of claim 21 wherein each structural element comprises a body text section, a graphical section, or a photographic section.

26. The apparatus of claim 21 wherein each structural element is stored in the database as an image bitmap associated with a corresponding metadata, the corresponding metadata further comprising a type of the structural element, and a coordinate in a page image of a corresponding document.

27. The apparatus of claim 21 wherein the predefined relationship comprises whether the query term is included in a graphical section of a document in the first set of results.

28. The apparatus of claim 21 wherein the predefined relationship comprises whether the query term is included in a title section, a figure section, a caption section, or a reference section of a document in the first set of results.

29. The apparatus of claim 21 wherein the predefined relationship comprises whether the query term is included in a photographic element or a graphic element of a document in the first set of results.

* * * * *